April 9, 1957 M. H. DAWSON 2,788,300
PROCESSING OF ALLOY JUNCTION DEVICES
Filed March 10, 1954
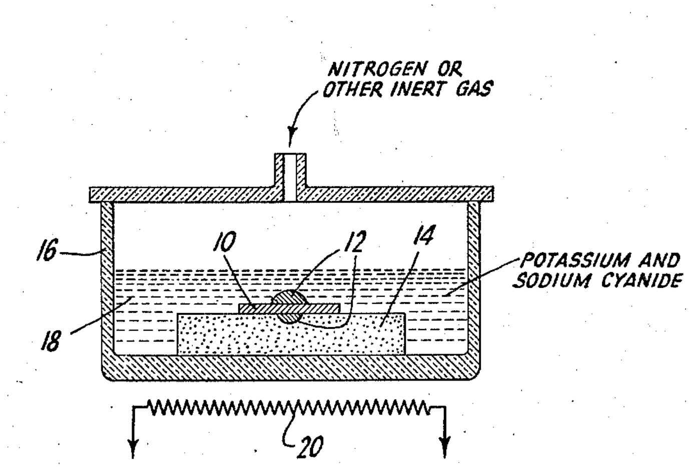
INVENTOR
MAYNARD H. DAWSON
BY Paul S. Martin
ATTORNEY United States Patent Office 2,788,300 Patented Apr. 9, 1957

2,788,300

PROCESSING OF ALLOY JUNCTION DEVICES

Maynard H. Dawson, Ipswich, Mass., assignor to Sylvania Electric Products Inc., a corporation of Massachusetts Application March 10, 1954, Serial No. 415,274

1 Claim. (Cl. 148—1.5)

The present invention relates to methods of processing alloy-junction devices, particularly alloy junction germanium transistors, and aims at improving their characteristics. Such devices have a body of semiconductive germanium, and have one or more rectifying junctions alloyed to such body.

The semiconductive germanium contains a donor element in n-type germanium or it includes an acceptor element in p-type germanium. Group III elements such as aluminum, gallium and indium are acceptors that are conventionally used for imparting p-type characteristics, while group V elements including arsenic, antimony and bismuth are conventionally used as donors. The controlling impurity of these groups is effective for determining semiconductor type, in a concentration below a part per million, disregarding lesser amounts of both impurity types incidentally present. Different concentrations of impurity are used to determine the resistivity of the semiconductor. A resistivity of five ohm-centimeters is typical for germanium transistors.

In semiconductive germanium the foregoing impurities are considered to be present in the lattice of the diamond-cubic crystal. At all temperatures those impurities diffuse or migrate extremely slowly in the solid, differing from the flow that occurs during formation of alloy junctions.

Alloy junctions are formed on germanium to establish rectifying connection. If the germanium is n-type, an acceptor element such as indium is applied to the germanium, and the assembly is heated for a period of minutes to induce the germanium and the applied material to alloy with each other. The indium in this example is called the "alloy" material. Instead of applying indium alone, an alloy of indium and lead or germanium is often used. In such alloy, the indium is present in substantial amounts, perhaps as low as one percent indium in lead, but it exceeds by several orders of magnitude the small traces of impurity in the semiconductive germanium body to which it is applied. To alloy with that body at a temperature below the melting point of the germanium which is to remain solid, the applied junction material must be of prominently different composition. Thus, two pieces of germanium of opposite types, both containing less than a part per million of donor and acceptor element, cannot be alloyed without raising their temperature above their melting point. This particular distinction between the applied alloy terminal material and the germanium body is of importance in the alloy junction process.

In the present invention, improved characteristics of junction devices are realized by treating such devices in a molten flux at an alloying temperature. Molten alkali metal cyanide is effective with germanium, sodium cyanide or potassium cyanide for example. The treatment may take place during the alloying process, or the alloy junction device may be so treated after initial alloying. It is sometimes considered desirable that the time of high-temperature exposure of a junction transistor should be minimized, and in such circumstances the molten flux treatment should accordingly be applied in the alloying process, thus avoiding repeated, unnecessary heating. It has been found that the treatment significantly improves the electrical characteristics of alloy junction devices; and the treatment represents an alternative procedure, that it substitutes molten flux for a controlled furnace atmosphere that would otherwise be required.

The treatment is believed to remove slight traces of rapid-diffusing impurities, prominently copper, at least from the surface regions of the germanium and the alloy junction. It is remarkable that the junction materials do not appear to be attacked. Apart from any residual copper present, antimony, lead, arsenic and bismuth, for example, evidently do not react with the molten cyanide, and alloy junctions of such materials can be processed in molten cyanide.

The accompanying drawing illustrates apparatus useful in a specific application of the invention. The drawing is a vertical cross-section, somewhat diagrammatic, of such apparatus. In the drawing there is shown a germanium body 10 that is pure except for a controlling trace of antimony that makes the germanium an n-type semiconductor. Dots of junction material 12, indium in this example, are bonded to opposite faces of the body 10. This bond is advantageously formed in a preliminary treatment by assembling the dots to the germanium body in a graphite fixture, and heating the assembly briefly in nitrogen at 500° C. Typically, germanium wafers only .005 inch thick are used with dots of indium, of the order of 0.1 inch in diameter.

The pre-fired unit is supported on a graphite block 14 in a porcelain container 16, and is covered with a two-to-one mixture 18 of potassium cyanide and sodium cyanide. Heater 20 (diagrammatically shown) is used to raise the temperature to 590° C. This treatment continues for about 20 minutes. Then the temperature is quickly lowered and held at about 200° C. for 40 minutes to protect the germanium from destructive stresses during solidification of the cyanide, and the system is thereafter cooled gradually.

The solid cyanide flux is rinsed off in demineralized water, and the unit is then boiled in demineralized water, and wiped dry. A conventional aqueous germanium-etching solution may be used thereafter, and further conventional processing steps and mounting operations are followed in completing the transistor.

Finished units are found to have lower collector current and a flatter collector current curve than like units made without the cyanide treatment. The present process also has the same advantage in respect to promoting stability and long transistor life as in the copending application of Crane and Wang, Serial No. 415,305, filed March 10, 1954, where the cyanide treatment is applied to semiconductive germanium. However, the treatment is here applied to transistor processing at a stage much nearer the completed stage, and this has the advantage of reducing possible surface contamination in the reduced number of processes that follow the treatment. There is the further feature that the junction material, and the critical surface of the junction itself, have the advantage of the cyanide treatment.

Variations in the foregoing disclosure and varied applications will occur to those skilled in the art and therefore the appended claim should be broadly construed, consistent with the spirit and scope of the invention.

What is claimed is:

The method of forming and treating electrical rectifying alloy junctions, including the steps of assembling a semiconductive germanium body of one conductivity type with an alloy terminal body containing an opposite conductivity type material, immersing the resulting assembly in a molten mixture of potassium and sodium cyanide, heating said bath and said assembly to a temperature of about 590° C., maintaining the bath and assembly at said temperature for about 20 minutes to remove undesirable impurities from the surface of said germanium body and to improve the electrical characteristics and stability of the resulting junction, cooling the bath and maintaining it at a temperature of about 200° C. for about 40 minutes, and thereafter further gradually cooling the bath and separating the resulting alloy junction device therefrom.

References Cited in the file of this patent

UNITED STATES PATENTS

| | | |
|---|---|---|
| 2,328,932 | Streicher | Sept. 7, 1943 |
| 2,370,960 | Holden | Mar. 6, 1945 |
| 2,449,484 | Jaffe | Sept. 14, 1948 |
| 2,569,347 | Shockley | Sept. 25, 1951 |
| 2,597,028 | Pfann | May 20, 1952 |